(12) United States Patent
Barak et al.

(10) Patent No.: US 12,135,769 B2
(45) Date of Patent: *Nov. 5, 2024

(54) PLATFORM AGNOSTIC OBJECT PROCESSING

(71) Applicant: Glicq, Inc., Livingston, NJ (US)

(72) Inventors: Matan Barak, Ra'anana (IL); Oren Barak, Princeton Junction, NJ (US)

(73) Assignee: Glicq, Inc., Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,657

(22) Filed: Mar. 25, 2021

(65) Prior Publication Data

US 2022/0129528 A1    Apr. 28, 2022

Related U.S. Application Data

(63) Continuation of application No. 16/513,265, filed on Jul. 16, 2019, now Pat. No. 10,990,657, which is a
(Continued)

(51) Int. Cl.
*G06F 21/31* (2013.01)
*G06F 3/04842* (2022.01)
(Continued)

(52) U.S. Cl.
CPC ........ *G06F 21/316* (2013.01); *G06F 3/04842* (2013.01); *G06F 9/541* (2013.01); *G06F 9/545* (2013.01); *G06F 21/62* (2013.01); *H04L 51/063* (2013.01); *H04L 51/56* (2022.05); *G06F 21/30* (2013.01); *G06F 2221/2141* (2013.01); *H04L 63/083* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS

| | | | |
|---|---|---|---|
| 6,059,939 A * | 5/2000 | Pierson | H01L 25/0657 438/758 |
| 9,059,939 B2 * | 6/2015 | Garimella | H04L 41/5054 |

(Continued)

FOREIGN PATENT DOCUMENTS

| | | |
|---|---|---|
| WO | 2015077358 A1 | 5/2015 |
| WO | 2019055905 A1 | 3/2019 |

OTHER PUBLICATIONS

Anonymous, "Email To SMS—SMS Gateway," Feb. 6, 2017, retrieved from the Internet URL:https://www.smsglobal.com/email-to-sms/XP055519058, [retrieved on Oct. 25, 2018].
(Continued)

*Primary Examiner* — Sharif E Ullah
(74) *Attorney, Agent, or Firm* — POLSINELLI LLP

(57) ABSTRACT

The present disclosure describes an integration platform providing a secure collaboration platform that simplifies and optimizes interactions between multiple users by facilitating secure cross-platform communications among users of the platform. Additionally, the present platform can provide a designated collaboration workspace for interactions within the platform.

21 Claims, 9 Drawing Sheets

Related U.S. Application Data continuation of application No. 16/133,075, filed on Sep. 17, 2018, now Pat. No. 10,402,552.

(60) Provisional application No. 62/559,486, filed on Sep. 15, 2017.

(51) Int. Cl.
| | |
|---|---|
| *G06F 9/54* | (2006.01) |
| *G06F 21/62* | (2013.01) |
| *H04L 51/063* | (2022.01) |
| *H04L 51/56* | (2022.01) |
| *G06F 21/30* | (2013.01) |
| *H04L 9/40* | (2022.01) |

(56) References Cited

U.S. PATENT DOCUMENTS

| | | | |
|---|---|---|---|
| 9,064,289 B2* | 6/2015 | Livshits | G06Q 50/10 |
| 10,402,552 B2* | 9/2019 | Barak | G06F 21/316 |
| 10,990,657 B2 | 4/2021 | Barak et al. | |
| 2008/0215694 A1* | 9/2008 | Chen | H04L 51/56 |
| | | | 709/206 |
| 2012/0173679 A1* | 7/2012 | Li | H04L 69/08 |
| | | | 709/223 |
| 2013/0066986 A1* | 3/2013 | DiCosola | H04W 4/02 |
| | | | 709/206 |
| 2013/0290531 A1* | 10/2013 | Azlin | H04L 67/565 |
| | | | 709/225 |
| 2018/0176268 A1* | 6/2018 | Malatesha | H04L 67/53 |

OTHER PUBLICATIONS

ISR and Written Opinion, dated Nov. 6, 2018, PCT/US2018/051318, filed Sep. 17, 2018, 13 pages.
Notice of Allowance, dated Jun. 27, 2019, U.S. Appl. No. 16/133,075, filed Sep. 17, 2018, 7 pages.
Notice of Allowance, dated Apr. 27, 2021, U.S. Appl. No. 16/513,265, filed Jul. 16, 2019, 13 pages.
First Action Interview Pilot Program—Pre-Interview Communication, dated Jan. 22, 2019, U.S. Appl. No. 16/133,075, filed Sep. 17, 2018, 4 pages.

* cited by examiner

PLATFORM AGNOSTIC OBJECT PROCESSING

CROSS-REFERENCE TO RELATED APPLICATIONS

This application is a continuation of U.S. patent application Ser. No. 16/513,265, filed Jul. 15, 2019, which is a continuation of U.S. patent application Ser. No. 16/133,075, filed Sep. 17, 2018, now U.S. Pat. No. 10,402,552, issued Sep. 2, 2019, and claims priority to PCT Application No. PCT/US18/51318, filed Sep. 17, 2018, which all claims the benefit of U.S. Provisional Application No. 62/559,486, filed Sep. 15, 2017, which is hereby incorporated by reference, in its entirety and for all purposes.

TECHNICAL FIELD

The present disclosure relates to a secure interface agnostic collaboration platform.

BRIEF SUMMARY

Systems, methods, and computer-program products associated with an integration platform are described herein. In some implementations, the present integration platform receives a request communication in a first communication platform (e.g., an email). The request communication can be associated with one or more actions that can be performed. In these implementations, a determination can be made that the request communication will be received in a second communication platform (e.g., SMS). In determining that the request communication will be received in a second communication platform, the present integration platform can automatically generate a view (e.g., a view that corresponds to the second communication platform). In these implementations, when the request communication is received, the one or more actions associated with the request communication can be performed using the view that corresponds to the second platform (e.g., using SMS).

In some implementations, a response communication can be received by the present integration platform, and the response can be in the second communication platform (e.g., SMS). In these implementations, the response communication can include a request to perform one or more of the one or more actions associated with the request communication. Additionally, a determination can be made that the response communication will be received in the first communication platform (e.g., email). In determining that the response communication will be received in the first communication platform, the present integration platform can automatically generate a view (e.g., a view that corresponds to the first communication platform). In these implementations, when the response communication is received, the request to perform one or more of the one or more actions can be approved using the view corresponding to the first communication platform (e.g., using SMS).

This summary is not intended to identify key essential features of the claimed subject matter, nor is it intended to be used in isolation to determine the scope of the claimed subject matter. The subject matter should be understood by reference to appropriate portions of the entire specification of this patent, and or all drawings, and each claim. The foregoing, together with other features and embodiments, will become apparent upon referring to the following specification claims, and accompanying drawings.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
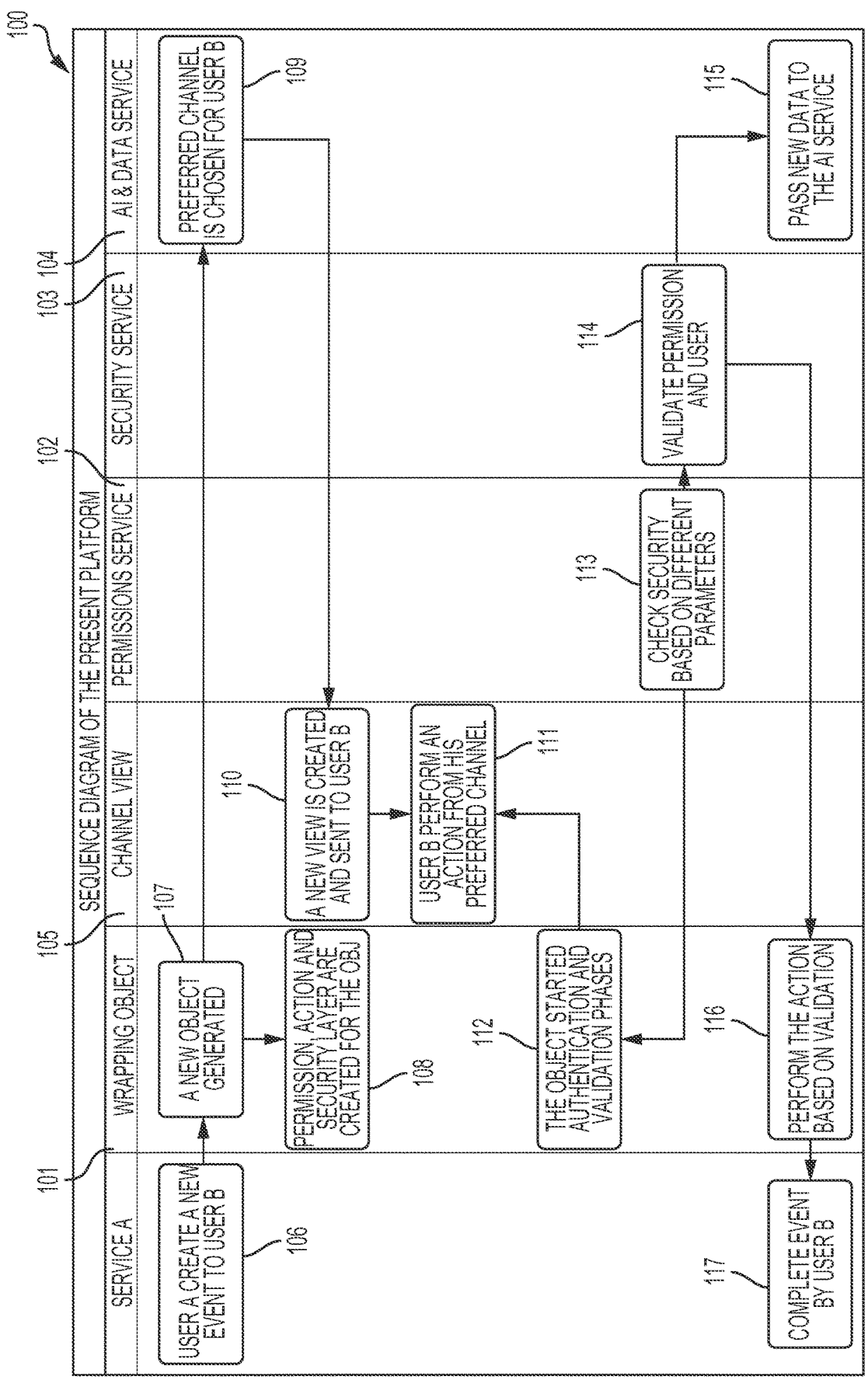
FIG. 1 is an example sequence diagram corresponding to the present integration platform 100.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present description describes an integration platform for one or more processes (e.g., projects, transactions, communications, among other processes). The present integration platform is a secure collaboration platform that simplifies and optimizes interactions between multiple platforms and users of such platforms by facilitating secure cross-platform interactions among users of the present integration platform and other participants that may interact with the platform. For example, the present integration platform can integrate various platforms, including communication platforms (e.g., Google's gmail™, Microsoft Outlook™, among others), messaging platforms (e.g., SMS, WhatsApp™, or the like), business operations platforms (e.g., SAP™, Salesforce™, JIRA™, Trello™, iManage™, or the like), a ticketing platform (e.g., Ticketmaster™, StubHub™, SeatGeek™, or the like), any combination thereof, and/or any other platform. Additionally, the present integration platform can provide a designated collaboration workspace for interactions within the present integration platform and externally from the platform, with the interactions being aggregated by the platform.

Currently, on most platforms, actions happen in front of a client within a browser (e.g., using a desktop browser or mobile browser). Systems receive an application-based email, which is a deep link that includes a specific link for facilitating an action (e.g., add a contact via a social networking or professional networking platform, or other action). In these platforms, the system then takes all the link parameters and opens a new web browser, software, or application, asks a user to provide log-in credentials to complete an authentication check, and navigates to a specific page related to the action.

Additionally, current platforms further require a trigger and an action for each end platform type involved in a process. For example, for a platform that can facilitate interaction between two communication platforms (e.g., Google's™ gmail, or the like), a messaging platform (e.g., SMS, WhatsApp™, or the like), this means that a connection to both end communication platforms is needed to complete an action (e.g., users who do not have an account with a particular end communication platform, would not normally be able to perform actions connected to both communication platforms). This is especially a problem when the end platforms are of different types and/or include different functionalities.

Moreover, because current platforms create a layer on top of other platforms (e.g., a third-party validation or a link outside of the platform connecting users), performing actions between differing platforms or methods of communication is not possible. Additionally, no current platform is completely secured. For example, even if a platform (e.g. Jira™, Pipedrive™, Google calendar™) supports actionability from an external communication platform (e.g., email), the action itself is not secured and can be easily hacked by malicious users. In another example, many platforms use one- or two-factor authentications, but with limited automated security procedures. In another example, on most current email and calendar applications, it is possible to respond for another user without being that user.

In the present integration platform, most actions happen on the server side. The platform back-end can authenticate actions and clients based on email data (e.g., activity, sender, etc.). Additionally, an action can be performed from the server side using the client's original platform (e.g., a communication platform, a business operations platform, or the like). In other words, the present integration platform can facilitate an action for a client without moving the client out of the client's original communication platform. Additionally, the present integration platform facilitates communication between clients by eliminating the need for the clients to communicate using the same type of end communication platform having the same functionalities.

The present integration platform further operates in real-time, processing data as it comes in. In the present integration platform, once communication is established with a first end platform type having first functionalities, other end platform types having other end platform functionalities dynamically and automatically connect. Thus, the present integration platform allows different platforms with different functionalities to join and communicate directly.

The present integration platform can enable a flexible and seamless usage of any "wrapping object". In the present integration platform, a "wrapping object" is a basic building block of a process, which includes any type of project, transaction, communication (e.g., messages, email, calls, VoIP communications, video chat, video, and/or other communication), task, image, storage file, action, ticket, pdf files, office files (e.g., Excel, PowerPoint, Word, etc.), Images (e.g., jpeg, tiff, gif, bmp, raw, etc.), and unique processes or other platforms (e.g., Argus, CAD, etc.), and/or any other process. In addition, the present integration platform will enable exporting each wrapping object to multiple different external platforms (e.g., Gmail™, Outlook™, Messenger™, Slack™, customer relationship management (CRM) platforms, and more). In some cases, to export one or more wrapping objects to certain platforms (e.g., CRM platforms, among others), integration and/or authorization is needed to use those platforms. In other cases, to export one or more wrapping objects to certain other platforms (e.g., Gmail™, Outlook™, Messenger™, Slack™, among others), there is no need for integration or authorization in order to provide a way for the clients to perform actions. In such cases where integration/authorization is not needed, the platform can generate and present the wrapping object in the same "rules" and user interface/user experience for which those platforms accept regularly new communications (e.g., messages, email, among others). Thus, the present integration platform is an interface agnostic solution that can be accessible and actionable from multiple external interfaces.

In some implementations, wrapping objects can be viewed, clicked, turned on, or otherwise used on any type of interface using an API and a unique interface built for the particular type of object. For example, the type of wrapping objects that can be interacted with using an API and a unique interface include SMS messages, MMS messages, emails (e.g., Gmail™, Outlook™, Yahoo™, etc.), messaging platforms (e.g., WhatsApp™, Facebook Messanger™, Slack™, Apple iMessage™, etc.), native applications (e.g., Android™ or iOS™), or Web applications (e.g., desktop or mobile applications).

Wrapping objects can have several basic generic default capabilities layers and/or fields embedded within them, such as, permission, view, time, share, send, remove etc., and recognition of the exact communication interface upon which the wrapping object was created. Additionally, a wrapping object API can be used to implement one or more new capabilities for other platform objects through an "add capability" layer. The "add capability" layer option will allow developers to create new kinds of customized wrapping objects (e.g., a customized wrapping object applicable for a specific use). One example of a new capability implemented by a wrapping object API is a new type of task. Another example of a new capability implemented by a wrapping object API includes using a CRM deal as a way for a developer to use the API in order to add more capability, such as wrapping another platform's object with a wrapping object in order to extend the capability, security, and reach of the other platform's object.

In some implementations, a wrapping object can have a unique signature defined by its layers and characteristics. A wrapping object can also be associated with a specific unique identifier (e.g., a universally unique identifier (UUID), hash code, serial number, or other unique identifier). Additionally, in some cases, a wrapping object can be generated using open source, so that objects can be enriched and enhanced, all by implementing the interface using predefined methods defined herein. For example, when implementing a new type of an object using a wrapping object, the representation methods for the different platforms could be written to include different built-in layers.

An Object Container can be a container including one or more other wrapping objects. For example, a 'chat' is a "wrapping object" that contains several "wrapping objects" of the type message (and is thus an Object Container), where each message can be using a different implementation of the "wrapping object" interface. The chat can further include storage objects (e.g., attachments, tasks, etc.), which can also be implemented as "wrapping objects."

The present integration platform can use wrapping objects as a building block concept to maximize the capabilities of collaboration between multiple parties participating in a process (e.g., a project, a transaction, a communication, among other processes). In one illustrative example, a process between multiple parties can include an entity-to-entity process, such as a real estate acquisition transaction, a lawyer file exchange, a development project, a merger and acquisition, suppliers purchase orders. In another example, a process can include an exchange of information between one or more entities and one or more customers of the one or more entities. Communications, files, documents, and/or other items can be exchanged in relation to the process. In some implementations, the present integration platform can aggregate one, many, or all of the wrapping objects into a specific location in a process designated collaboration workspace (e.g., a specific chat discussion or a specific storage folder in a virtual data room). In these implementations, the communication platform where a message is received does not matter.

For example, when a message is received by a user (e.g., using email, chat, SMS, VoIP etc.), the message can be aggregated for that user into a relevant or related location within a particular designated workplace in the present integration platform. Moreover, any user in a specific discussion can use any external platform/interface (e.g., email, messaging etc.), that the user wants to use, and the integration platform will listen to and evaluate the message as well as any communication concerning the message, and dynamically, automatically, and in real-time, sort and aggregate any data related to the message (e.g., other communications, other actions performed or to be performed, other users, other wrapping objects, etc.), into the particular designated workplace within the integration platform. In other examples, the integration platform can handle actions that are performed directly in external platforms that are external from the integration platform (e.g., a task in JIRA™, a Salesforce™ object, among others).

Additionally, the aggregation capabilities are not limited to communication functionalities. In some implementations, the integration platform can use crawler technology to aggregate from one or more relevant websites, information and insights related to a process (e.g., a message, a transaction, a project, and/or other process) within the integration platform. In some implementations, advanced aggregation capabilities can enable users to get some or all of the information and communication that is relevant to a process (e.g., a message, transaction, project, and/or other process) from a single location or through a single communication channel, instead of shifting between multiple different communication channels, websites, and software. For example, to perform aggregation, the integration platform can listen to incoming events to those platforms and can aggregate upon relevancy to a specific process (e.g., message, transaction, deal, project, and/or other processes). In some cases, it can be required that user authorization is obtained before aggregation can be performed, such as using social network login or other authorization credentials. In these implementations, the advanced aggregation capabilities can be performed without the knowledge of or input from the users on the integration platform.

The integration platform can also support the conversion of recorded calls, VoIP, and ongoing discussions, into text messages that can also be aggregated into a relevant location within a particular designated workspace. This capability can enable automatic capturing and documenting of a significant portion of a process environment in real-time as a process is occurring.

In some implementations, wrapping objects created within the integration platform can be distributed among one or more different external communication interfaces that the other participants involved in a process (e.g., a transaction, chat, email exchange, and/or other process) are using. For example, the object data of a wrapping object can be sent to the server of an external platform that is external to the integration platform. A wrapping object can be sent as an external notification, where the actionability (e.g., an option to perform an action) is added to the notification. Such distribution of wrapping objects can be particularly useful when one or more other participants are not registered to the integration platform. Thus, the other participants are not forced to use the present platform, but the integration platform still enables the other participants to continue to participate in a process and to continue to use the communication type they used to initiate their communication (i.e., the communication type they are familiar with). For example, by enabling distribution of wrapping objects, the integration platform prevents users from being distracted by having to move to another platform to perform an action (e.g., navigating to a proprietary website, such as Linkedin™, to login and complete an action, such as confirm a contact), but still allows the users to perform secured actions as if they were in the proprietary platform interface.

For example, if a chat participant is using a particular type of email account to communicate (e.g., Gmail), a message created through the integration platform will be distributed back to that participant through Gmail. Additionally, any continued communication by that user within the particular type of email account can also be aggregated to a relevant workspace/location within the integration platform. Other cross-platform processes that can be performed include navigating in a data room, filling out a form, commenting on a document, changing client order details, etc.

This ability to collaborate across different external platform types by performing specific relevant actions is significant for users that have difficulty adopting a new or additional platform and for non-registered participants that do not want to learn and adopt new platforms for an ad-hoc process. The integration platform does not require users to shift their communication to the integration platform to participate in processes (e.g., transactions, actions, discussions, etc.). Users can initiate communication and continue to communicate and engage from whatever platform/interface they choose to use. Additionally, the integration platform is able to capture one, many, or all communications related to the processes (e.g., transactions, actions, discussions, etc.).

The integration platform is also platform independent in that the integration platform technology supports the aggregation, distribution, messaging, and engagement capabilities across various devices and platforms (e.g., desktop, laptops, mobile phones, tablets etc.). Moreover, the integration platform can facilitate providing plug-in chat rooms (e.g., within relevant websites), so that users are able to chat while on those web sites.

Thus, as noted above, the integration platform facilitates continuity among participants of a process (e.g., a message, transaction, project, and/or other process). Specifically, the integration platform enables users to continue their process using whatever device or platform that is comfortable, preferable, or familiar to them. Users are not forced to change their habits in order to communicate or participate. Users can elect any platform they want or prefer to receive process communications.

In some implementations when a user does not have access to Internet or Wi-Fi (i.e., the user only has access to a cellular network), the integration platform includes the unique capability of facilitating continuity (e.g., using SMS or MMS). For example, a user can elect to continue to discuss and receive messages related to a process through their SMS platform or MMS platform. SMS or MMS does not require an Internet connection, and instead work using the cellular network of the network provider. Therefore, a user can take an action within the task management platform using SMS or MMS without connecting to the Internet. Thus using the present platform, a user can continue to be connected to a process even when the user does not have Internet. This is a significant attribute of the integration platform with respect to the process continuity functionality.

The integration platform differs from prior communication platforms in that the integration platform can provide multiple services. In particular, the integration platform provides a means for actionability from within a given communication channel itself. Prior platforms are known to send a link in response to a request and then when initiated, the link redirects the user to a different platform (e.g., a web browser requiring a log-in, etc.), outside the initial communication channel. Additionally, the integration platform is not platform specific and instead provides a generic communication solution that is functional with any communication channel.

In some implementations, one or more actions can be performed by one or more different services. Each service can implement a different communication channel, and all the services can be included and aggregated within a single communication on a first communication channel and sent to an intended recipient. Once validated or authenticated by and within the integration platform (e.g., not by a third-party initiated by a link that leaves the integration platform), the intended recipient can interact with the services and perform the actions within the single communication, using a second communication channel. Within the integration platform, this is possible even if the second communication channel is not associated with the actions and the corresponding services, and even if the second communication channel is different from the first communication channel. Such functionality is possible even if a user is a non-registered participant of the process.

FIG. 1 is an example sequence diagram corresponding to the integration platform 100. In some implementations, a wrapping object 101, a permission service 102, a security service 103, and the AI and data service 104 are all part of a connector layer which can connect an application layer to a translator layer. In these implementations, the channel view 105 would be part of an application layer.

In some implementations, User A can create 106 a new event that is relevant to User B. An event can be any type of event (on top of a specific object within a specific service A), from any user within any organization. Events can include, for example, a new task or event, sharing a file, sharing an entire data room with multiple folders and files, sharing a message, requesting something, sending an itinerary, sending a delivery, sending a delivery document, etc. A new wrapping object is generated 107 that corresponds with the new event, and the new wrapping object is placed on top of the specific object in service A.

In some implementations, when a new wrapping object is created, a form of preferred communication can be automatically determined for the recipient of the event, and an action for the new wrapping object is automatically generated.

In some implementations, for example, the system can direct an interface layer to determine a preferred channel 109 for User B. In these implementations, individual users can define one or more preferences. Additionally, in these implementations, when a user is new to the integration platform, their preferences can be pre-determined according to historical activity and information, for example. In some implementations, when user A generates a task, the task can be sent 110 using a certain communication channel, such as to an email address (e.g., when the preference of the intended receiver of the event would be unknown). While a task is used herein as an example, other processes can also be implemented, such as a file, a Salesforce™ opportunity, a message, a ticket, etc. As described in more detail below, actions of the task can be performed directly from the email (as one or more actionability items added to a wrapping object). Over time, if the system learns that the preferred method of communication of the intended receiver is a different communication channel (e.g., SMS), then the system can send the task using the different communication channel (e.g., as an SMS message) either alone or in addition to the originally-selected communication channel (e.g., as an email). In some cases, a default communication channel (e.g., SMS, MIMS, email, or other communication channel) can be automatically defined for a user, can be manually selected by the user (e.g., a user logged-in to the integration platform), or can be automatically suggested but also configurable by the user.

In some implementations, when a new wrapping object is generated 107, an action for the new wrapping object is also automatically generated. Additionally, a security layer and permissions can be automatically generated 108 for the new wrapping object. In these implementations, the new wrapping object can be associated with an event and the new wrapping object can function as a wrapper that can be placed around the specific object. Thus, the new wrapping object is associated with service A as a wrapper, when service A includes a task (e.g., having three associated actions which can be performed by the intended recipient 111, for example, complete the task, assign the task, and set a reminder for the task). In this example, the task may also include one or more corresponding parameters (e.g., content). In another example, direct actionability items that can be added include data room navigation options.

The integration platform wraps or surrounds the task with a new wrapping object. In some implementations, for the new wrapping object, all of the actions are extracted and used to generate one or more wrapping object actions. This includes determining one or more permissions for users who can then interact with or be assigned to the wrapping object. The integration platform further generates one or more default users having knowledge of how to communicate with user A using user A's chosen communication platform. The default users can facilitate communication between user A and the intended recipient when an event is sent to an intended recipient that is not part of user A's chosen communication platform. Thus, the integration platform can facilitate communication between user A and the recipient that is not currently using user A's chosen communication platform.

In some implementations, one or more artificial intelligence (AI) layers can be added to a new wrapping object. An AI layer can be used to make predictions using different information including, the information added to the new wrapping object, events associated with the new wrapping object, and relationships that the new wrapping object can have with other objects in the system.

In some implementations, additional layers provide additional functionalities. For example, in a channel view an interface is automatically presented to the user, and the interface can facilitate communication in one or more platforms other than the original platform integrated with the integration platform, which can include a communication platform or other integrated external platforms. For example, if the original platform was a communication platform such as SMS and the recipient only has email, the channel view can automatically present the task in an email interface to the intended recipient. The channel view thus facilitates direct communication between parties without the need for the user to be re-directed (e.g., sent a link in an email and then re-directed to a third party website in order to complete an action). Channel view communication mediums can include a variety of communication platforms including SMS, email, etc.

In some implementations, when a new wrapping object is generated, one or more associated new wrapping object functionalities are also automatically generated. For example, information from an application layer can be used to create a relevant view or interface for the new wrapping object. In these implementations, individual views can be created according to the requirements (e.g., communication type) of the intended recipient. Thus, all possible views for a new wrapping object are not needed or generated automatically. By not generating all possible views, the system is able to reduce the amount of processing power and bandwidth needed to generate the individual custom views for individual intended recipients.

In some implementations, once the relevant view is generated, the relevant view is presented to the intended recipient in an interface that corresponds to the platform of the relevant recipient. For example, if the sender is using a first communication platform and the intended recipient is using a second communication platform, the interface presented to the intended recipient corresponds to the second communication platform. The generation and presentation of the interface to the intended recipient can be without the sender or the intended recipient knowing that the communication channels are different from one another.

In some implementation, when the intended recipient receives the task in the second communication platform, the intended recipient can perform one or more of the actions associated with the task in the second communication platform. Once the intended recipient has responded to the task (e.g., by selecting or performing an action), a response can be automatically or manually returned to the sender. The response to the sender is then displayed in a relevant view in the first communication platform that the sender uses to communicate. Thus, parties to the communication do not have to use any particular communication platform to send or receive the communication within the integration platform.

In some implementations, initiating an action (e.g., by the intended recipient), will automatically cause an authentication and validation process 112 to begin on the security layer. In these implementations, one or more parameters can be used to check the security 113 of the sender, the intended recipient, or the information being sent. The authentication process can include one or more requirements including confirming or validating 114 that the intended recipient has permission to respond and that the response is validated in the security layer. Additionally, the validation process is able to occur within the integration platform without having to leave the integration platform (e.g., receive a link and get validated at a third party web site by entering user name and credentials).

In some implementations, new data is passed to an Artificial Intelligence (AI) and data layer or service 115 (e.g., after the data has been authenticated on the security layer). The new data can be used to confirm that the intended recipient has performed the action on top of the specific object originated by User A. Additionally, the new data can indicate that the action was performed by the intended recipient within a specific amount of time, or within a specific interface or channel. In some cases, the new data can also be used for security purposes. This information about the intended recipient can then be used in the future with respect to the intended recipient or with respect to other users (e.g., when generating a default user in the system for first time users with no data history). This AI can be used to provide a predicative analysis associated with future users (e.g., regarding when and where they might perform certain actions with respect to specific services).

Data on the AI and data layer can be stored and available for use at a later time (e.g., generating behavioral preferences or actions). Additionally, after the data has been authenticated, the action can be completed or performed 116 by the intended recipient. The action (e.g., the event), can be completed 117 by the intended recipient, for example, in the communication platform initiated by User A (e.g., the first communication platform).

Figure 2A:
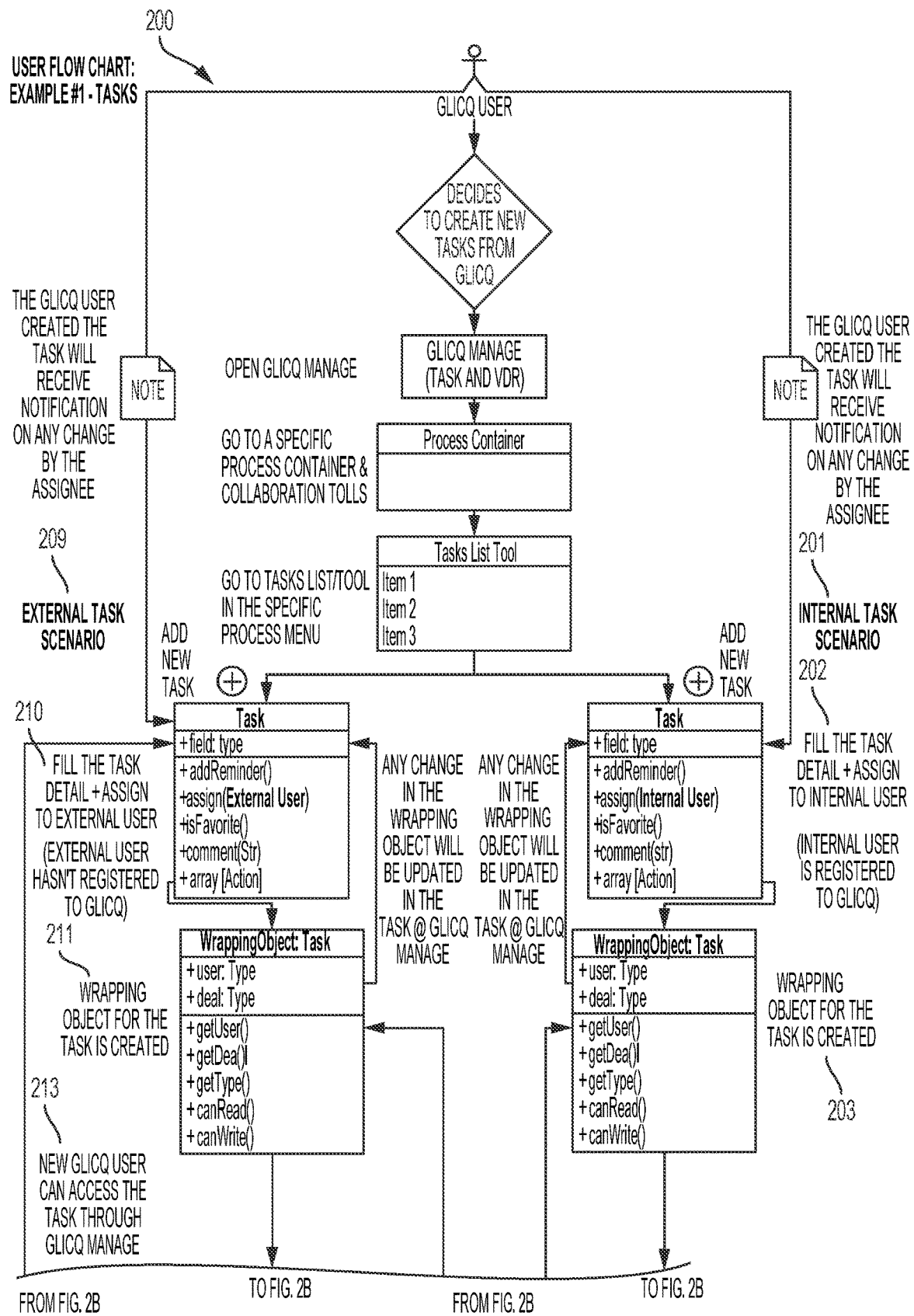
FIG. 2A and FIG. 2B illustrates an example of a flow diagram 200.
Figure 2B:
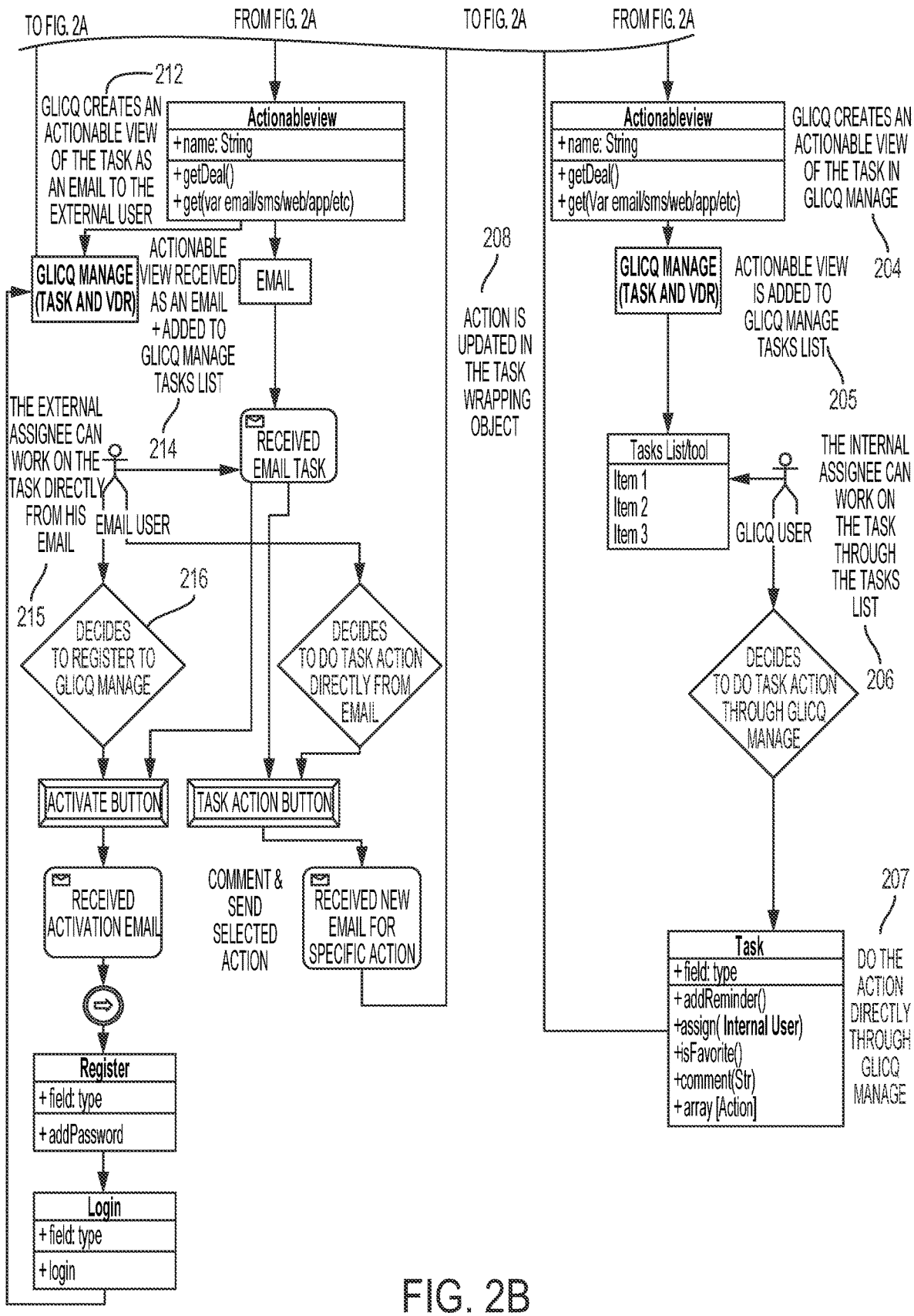

FIG. 2A and FIG. 2B illustrate an example of a flow diagram 200. This diagram includes a task process using the different objects in the flow process. Tasks can be processed within the integration platform by both internal assignees and external assignees.

In some implementations, an internal task scenario 201 can be used (e.g., when an internal user registered within the integration platform has generated the task). In these implementations, the task can be filled in and assigned 202 to the internal user that generated the task. Next a wrapping object (including one or more associated actions), of the task is generated automatically 203. In these implementations, changes in the wrapping object can be dynamically and automatically updated within the system once the wrapping object is generated (or created) 203.

Additionally, once a wrapping object has been generated, the integration platform can automatically generate an actionable view 204 of the task (e.g., the action associated with the task). This actionable view can then be added 205 to a task list. The internal assignee can work on the task 206 through the task list. If the internal assignee determines that they would like to perform an action associated with the task, the integration platform facilitates performance of the action 207 by the internal assignee. The integration platform further automatically updates 208 the action in the wrapping object once the action has been performed by the internal assignee.

In some implementations, an external task scenario 209 can be used (e.g., when a new external user that is not registered within the integration platform has generated a task, when an existing registered user that is logged out of the integration platform has generated a task, or the like). In these implementations, the new external user or logged-out registered user can access 213 the task through the manage function within the integration platform. Similar to the internal task scenario 201 above, the task can be filled in and assigned 210 to the external user that generated the task. Next a wrapping object (including one or more associated actions) of the task is generated automatically 211. In these implementations, changes in the wrapping object can be dynamically and automatically updated within the system once the wrapping object is generated (or created) 211.

Additionally, once a wrapping object has been generated, in this implementations, the integration platform can automatically generate an actionable view 212 of the task (e.g., the action associated with the task). For external assignees, the actionable view can be generated as an email (or using any other suitable communication platform) and then transmitted to the external assignee. Once the actionable view email is received by the external assignee, the actionable view can be added 214 to a task list. The external assignee can interact with the task from the email 215 (e.g., by activating a task action link and receiving an email associated with the action). The external assignee can also choose to register 216 with the manage function within the integration platform (e.g., by activating a registration link and completing a registration email). As noted above, the integration platform further automatically updates 208 the action in the wrapping object once the action has been performed by the external assignee.

Figure 3:
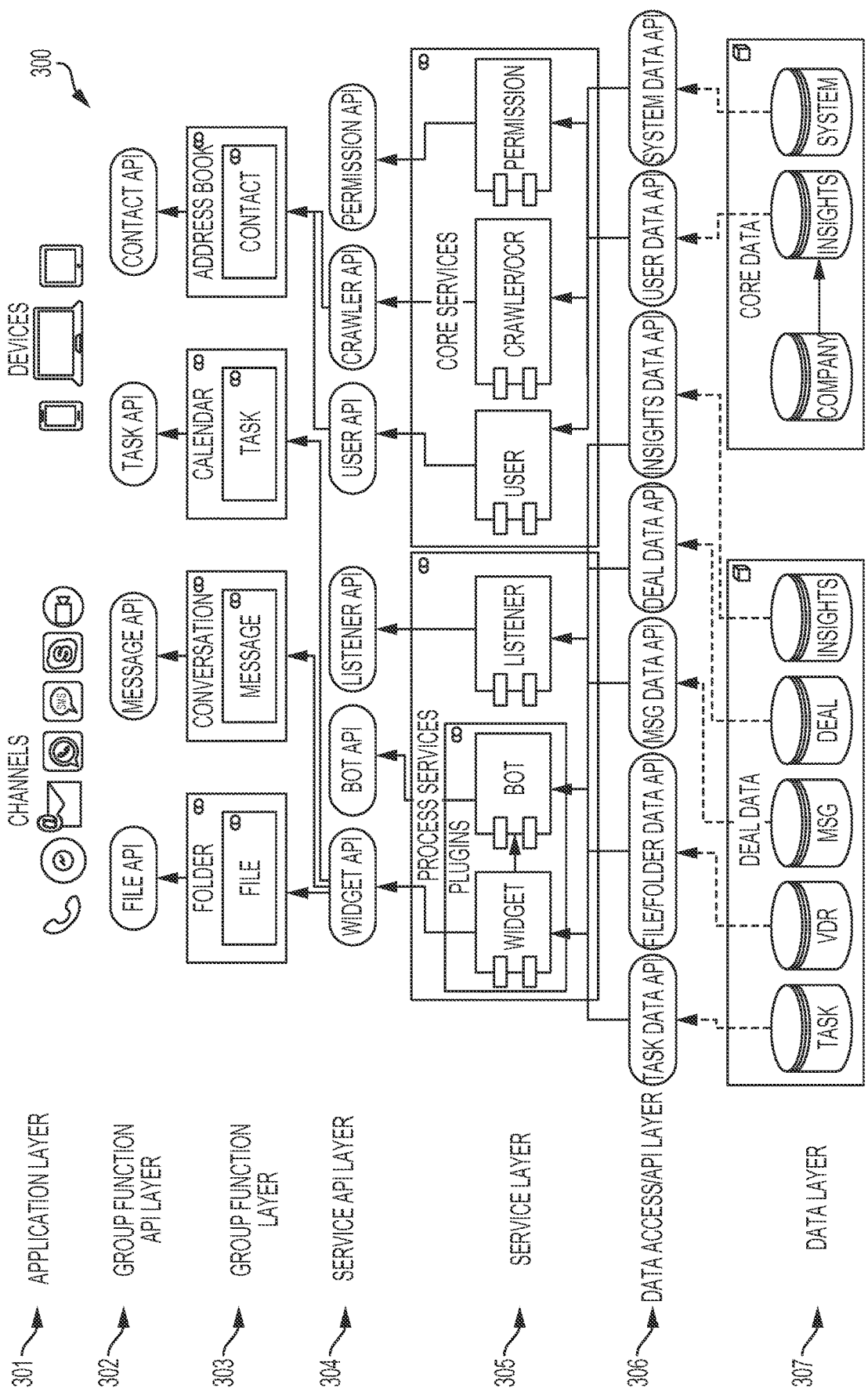
FIG. 3 illustrates an example system diagram 300.

FIG. 3 illustrates an example system diagram 300. System 300 can include several layers, such as, an application layer 301, a group function API layer 302, a group function layer 303, a service API layer 304, a service layer 305, a data access API layer 306, and a data layer 307.

In some implementations, application layer 301 can include applications and devices. In these implementations, the group function API layer 302 can include one or more APIs that can facilitate a group function or a group function application on group function layer 303. Additionally, the service API layer 403 can include on or more APIs that can facilitate a service on the service layer 305. Finally, the data access API layer 306 can include one or more APIs that can facilitate access to data on the data layer 307.

Figure 4:
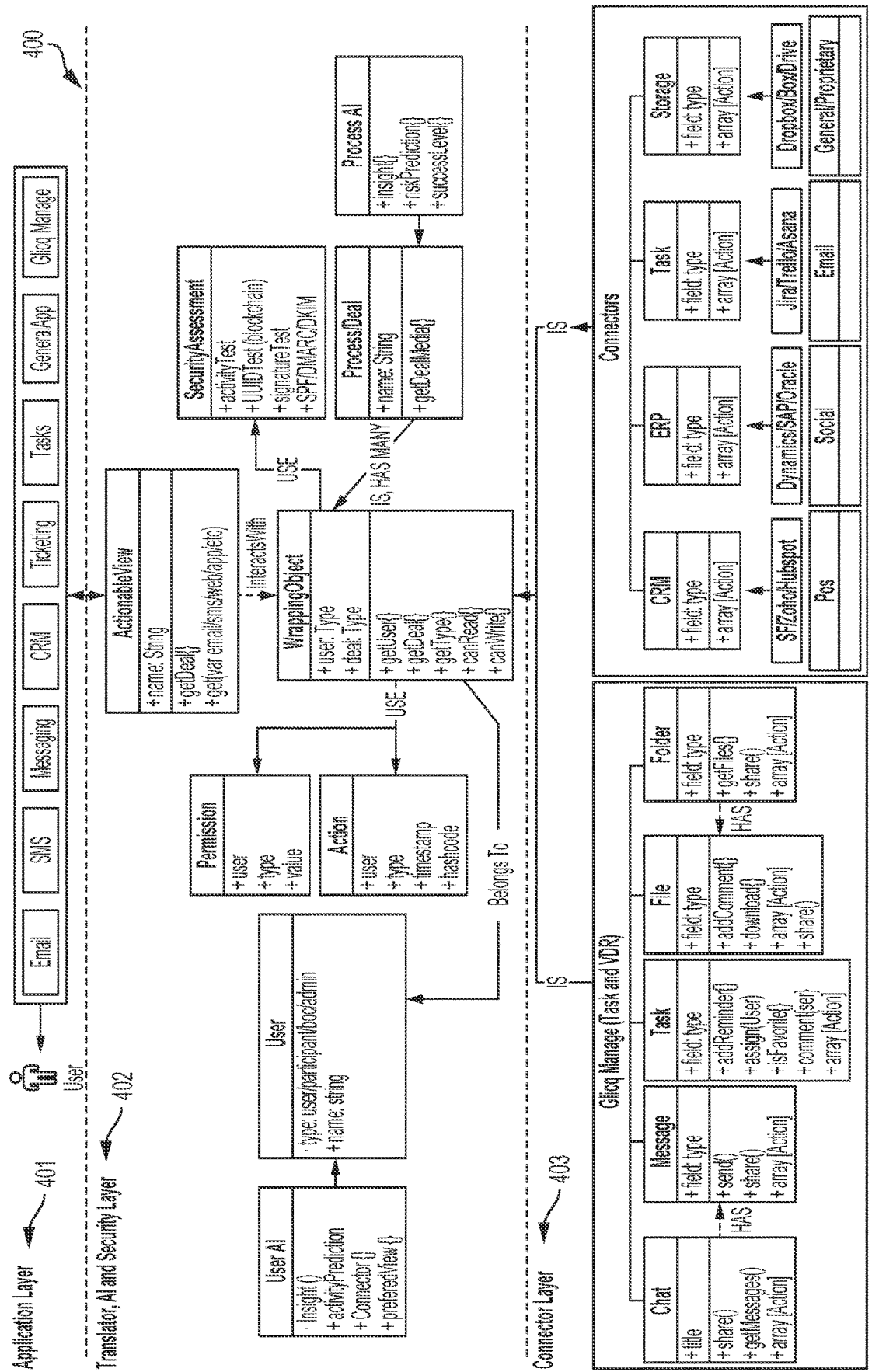
FIG. 4 illustrates example architecture 400 corresponding to the present integration platform.

FIG. 4 illustrates example architecture 400 corresponding to the integration platform. The integration platform includes several layers, each layer having one or more specific functionalities within the integration platform. Example architecture 400 includes an application layer 401, a Translator, AI, and Security layer 402, and a connector layer 403. Additionally, the integration platform includes an integration layer that is usable across any platform. Once the integration is completed, it does not need to be replicated. Integration occurs without user input. In some cases, the integration can use priorities. In some cases, actions that are done directly from other external integrated platforms (e.g., JIRA™ tasks, Salesforce™ objects, etc.) will be recognized as actions in the integration platform (e.g., as integration-based actions).

As noted above, the integration platform includes an application layer 401. The application layer can be used to initiate an action (e.g., from an application). The application layer facilitates viewing a specific object (e.g., within the external layer), in connection with the application layer. Specifically, the application layer facilitates viewing an object in an accessible way within the original communication channel or within the back end platform communication channel. In some implementations, a integration platform object can generate a channel view or an interface that is familiar to the user (e.g., based on the application the user was using). Thus, if the user's originating communication channel is email, the integration platform can generate an interface having the functionality and familiarity of an email platform.

The integration platform also includes a security layer 402. In some implementations, the integration platform includes a link (e.g., an HTML link or other suitable type of link) authentication process that does not require a user login. For example, the link does not take the user device to a new webpage or application, and instead opens or sends the actions directly from within the platform the user has received the object. The user is already authenticated to that communication channel or platform, and the integration platform is adding ways to validate the user. In some implementations, the security layer can implement a particular action (e.g., look at email signature, or the like) or other security actions (e.g., SPF, DKIM, DMARC, other ways to secure and authenticate messages, and/or other security actions) as described in more detail below with respect to FIG. 5, or look at activity within an email or other communication (e.g., analyze dynamic content), to determine whether a user has opened the email and/or has performed an action (e.g., real-time analytics, such as, based on the data, actions are approved). For example, using the security layer, the integration platform can prevent cyber-attacks by learning and confirming user behaviors. Over time the integration platform can learn a user's behavior and parameters (e.g., activity data). In some implementations, this learned user activity data can be used to generate predictions (e.g., whether a user will take a particular action). Additionally, in some implementations, a security layer can facilitate authentication of the intended recipient. Prior known platforms are easily manipulated and edited (e.g., not even requiring code to make a change to a profile that does not belong to the user). In some implementations, this integration platform cyber solution allows any external communication channel to be secured. This will be discussed further below in the description of FIG. 5.

As a further security layer functionality, in some implementations, each action within a connected object (e.g., an object with a corresponding connection) is associated with a unique identifier (e.g., a key based on a particular action). The unique identifier can be used to determine whether the user has permission to do an action, information relevant for email authorization, and a chain of one or more connections. In some implementations, the chain of one or more connections can be used to determine whether the user is connected to one or more other objects that are related to the connected object.

In some implementations, the integration platform includes an object that is associated with a service and a user. This object includes one or more different parameters, methods, or functions. The object can be oriented within a wrapping object, and the wrapping object can be a class that includes one or more additional classes. Thus, the wrapping object can be a combination of one or more different classes and different objects. The objects and the classes within the wrapping object can also be connected to one another. Thus, when a new object (e.g., a task object), is received from a first communication channel, that includes one or more actions, a new wrapping object is generated and initialized (e.g., using a constructor). The integration platform considers the class of actions within the integration platform. The information about the task actions is then passed to the integration platform and the actions of the task are generated according to the first communication platform.

The means of presenting the integration platform includes determining (e.g., automatically or based on user input, such as defining a default channel) how to present an object including data and actions in an optimum way for presentation within a specific integrated platform (e.g., a communication channel (or channel view), or other external platform integrated with the integration platform). Thus, when a task is received, the information will include one or more data points and/or actions. The integration platform then determines the optimum presentation for a given user in that user's preferred communication channel. By optimizing the presentation, the integration platform is able to increase the conversion rate (e.g., user interaction rate).

As noted above, the integration platform also includes a connector layer 403, which is an intermediary layer for a connection to back-end platforms (e.g., using an API associated with a back end platform). Within the connector layer, an object that has a corresponding connection can be wrapped within an integration platform object. In some implementations, the integration platform object can include a method for implementing all the actions within a connected object, and provide user permission for the specific type of connected object (e.g., what actions can be performed and by which objects or end platforms with respect to the connected object). In some implementations, services are initiated within the connector layer from an initial communication platform. In these implementations, the integration platform can determine whether the intended recipient is using a second communication platform that is different than the initial communication platform, and then generate a view that is familiar to the intended recipient (e.g., in the second communication platform).

Figure 5:
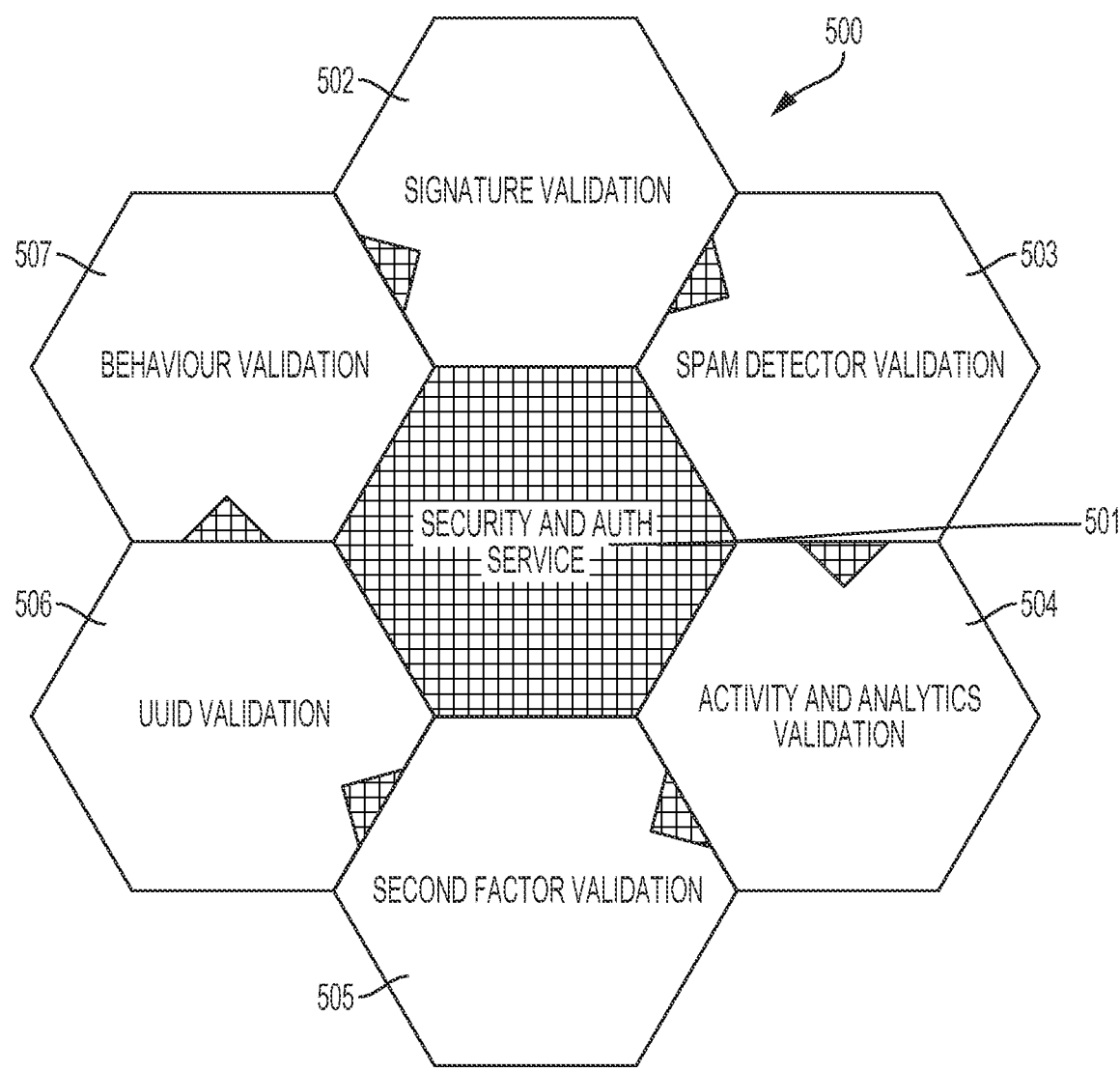
FIG. 5 is an example security diagram 500.

FIG. 5 is an example security diagram 500. In some implementations, the integration platform will include a security and authentication service 501. The security and authentication service can include one or more validations including, but not limited to, a signature validation 502, a spam detector validation 503, an activity and analytics validation 504, a second factor validation 505, a universally unique identifier (UUID) validation 506, and a behavior validation 507.

In some implementations, a Signature Validation 502 can be used to validate a user based on, for example, an email, an SMS, or a messaging signature. The signature data can be matched to the permission data associated with an object to determine whether a user (or a user agent) has permission to perform a specific action.

In some implementations, a Spam Detector Validation 503 can be used to test for the existence of one or more spam detectors parameters (e.g., SPF, DKIM, DMARC), for a user (or user agent) validation using for example, an IP address, a domain address, a server address, and an email address.

In some implementations, an Activity and Analytics Validation 504 can be an algorithm that can get real-time and/or near real-time information about user activity within a communication channel (e.g., an email channel). The information will be available according to the type of communication channel used. This activity can then be validated using the information, to determine whether the activity is human activity (e.g., not malicious behavior). In this implementation for example, this validation will not approve an object without determining that there has been activity (e.g., an email has been opened).

In some implementations, a Second (or two) Factor Validation 505 can be used in situation where a two-factor authentication process is needed (e.g., safe mode required for specific objects). In this implementation, a double authentication can be performed through a second communication channel. Thus, if the first communication channel is SMS, the second validation can be performed using an email channel.

In some implementations, a UUID Validation 506 or hashcode for one or more actions can be generated for one or more objects. For example, when a new wrapping object is generated, a signature corresponding to that object is also generated automatically. The signature can include a communication (e.g., an email), and the signature can be based on a unique identifier that is generated by the integration platform using information from within the new wrapping object (e.g., permissions, relevant related objects, etc.). For example, a unique email address (which can be used as an alias) can be generated for the object based on a a unique identifier (e.g., a hashcode). In some cases, a unique phone number or other communication identifier can be generated for the specific object as an alias. In these implementations, the integration platform can generate a hashcode for example, using user permissions and one or more related objects (e.g., a blockchain algorithm modified to be a block-tree).

The UUID can also be transmitted to the server within the integration platform system for validation on one or more actions. The integration platform facilitates the generation of a unique identifier that can correspond to a particular action and the activity associated with that action. In some cases, per specific permission (user) can be designated, such that an object n and an action A unique identifier will look differently for a first user and a second user. Thus, the integration platform associates a unique identifier with a wrapping object and a user so that other users would not be permitted to perform an action assigned to a first user without knowing and having access to the unique identifier associated with the action, the wrapping object, and the user.

In some implementations, to approve an action (e.g., within an email), the integration platform will search for relevant activity with respect to the action. In these implementations, the UUID Validation can further require that the relevant activity is performed within a time period or threshold. Thus, without related, relevant, or timely user activity, the integration platform will not approve of an action to be performed by that user.

In some implementations, a Behavior Validation 507 (e.g., a machine learning (ML) solution) can be used to learn the behavior of a user over a given time period (e.g., when a user responds, how the user responds, how quickly a user responds, a location of a user, etc.). This behavior can include activity, time measurements, favorite actions, location of the user, favorite platforms (e.g., for communication), among other behaviors. Once the user behavior is studied, predictive analysis can be used to determine whether an action is being performed by a same or different user. The predictive analysis can be determined dynamically and in real-time and can be used to determine where to send the object (e.g., which communication channel). The behavior validation can also be used to validate a uniqueness associated with a user, and thus to validate the user (e.g., based on the user agent, an application, and an application version). In these implementations, if the behavior is not validated, then the integration platform can deny the user the ability to perform an action.

Figure 6:
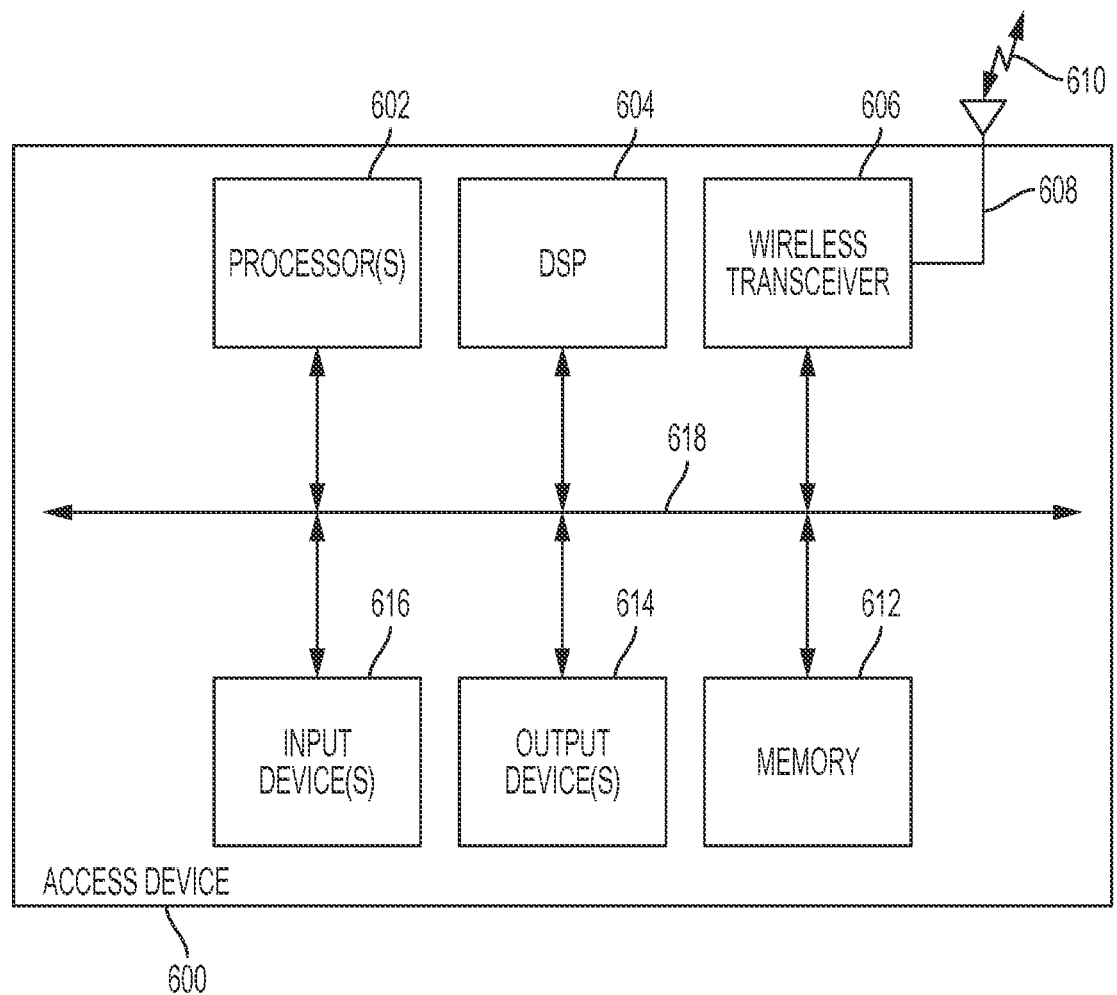
FIG. 6 illustrates an example of an access device 600.

FIG. 6 illustrates an example of an access device 600. The access device 600 may include any human-to-machine interface with network connection capability that allows access to a network. For example, the access device 600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an interne of things (IoT) device interface (e.g., an Internet enabled appliance such as a wall switch, a control interface, or the like). The access device 600 includes hardware elements that can be electrically coupled via a bus 618 (or may otherwise be in communication, as appropriate). In one embodiment, the bus 618 can be used for the processor(s) 602 to communicate between cores and/or with the memory 612. The hardware elements may include one or more processors 602, including without limitation one or more general-purpose processors and/or one or more special-purpose processors (such as digital signal processing chips, graphics acceleration processors, and/or the like); one or more input devices 616, which can include without limitation a camera, a mouse, a keyboard, a touch sensitive screen, a touch pad, a keypad, and/or the like; and one or more output devices 614, which can include, without limitation, a display, a printer, and/or the like.

The access device 600 may include one or more wireless transceivers 606 connected to the bus 618. The wireless transceiver 606 may be operable to receive wireless signals via antenna 608 (e.g., signal 610). The wireless signal 610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 606 may be configured to receive various radio frequency (RF) signals (e.g., signal 610) via antenna 608 from one or more gateways, network devices, other access devices, cloud networks, and/or the like. Access device 600 may also be configured to decode and/or decrypt, via the DSP 604 and/or processor(s) 602, various signals received from one or more gateways, network devices, other access devices, cloud networks, and/or the like.

The access device 600 may further include (and/or be in communication with) one or more non-transitory machine-readable storage mediums or storage devices (e.g., memory 612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 612, such as RAM, ROM, FLASH, or disc drive, and executed by processor(s) 602 or DSP 604. The access device 600 can also comprise software elements (e.g., located within the memory 612), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-5 above, may be implemented as code and/or instructions executable by a computer (and/or a processor within a computer); in an aspect, then, such code and/or instructions can be used to configure and/or adapt a general purpose computer (or other device), to perform one or more operations in accordance with the described methods. Such functions or code may include code to perform the steps described above with respect to FIGS. 1-5 above. The memory 612 may be a non-transitory machine-readable storage medium, processor-readable memory, and/or a computer-readable memory that stores the one or more computer-program products configured to cause the processor(s) 602 to perform the functions described. In other embodiments, one or more of the functions described may be performed in hardware.

A set of these instructions and/or code might be stored on a non-transitory machine-readable storage medium, such as the memory 612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the access device 600 and/or might take the form of source and/or installable code, which, upon compilation and/or installation on the access device 600 (e.g., using any of a variety of generally available compilers, installation programs, compression/decompression utilities, etc.) then takes the form of executable code.

Figure 7:
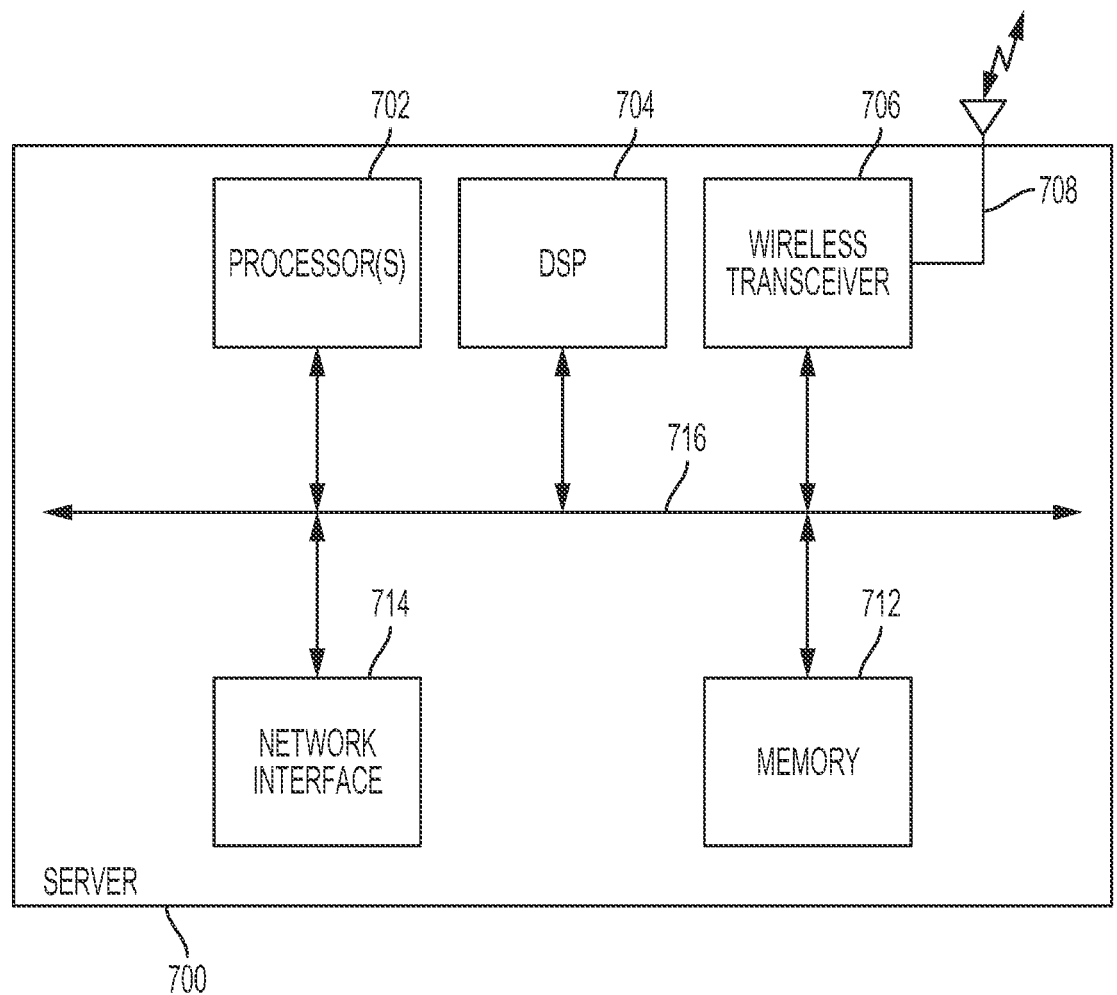
FIG. 7 illustrates an example of a server 700.

FIG. 7 illustrates an example of a server 700. The server 700 includes hardware elements that can be electrically coupled via a bus 716 (or may otherwise be in communication, as appropriate). In one embodiment, the bus 716 can be used for the processor(s) 702 to communicate between cores and/or with the memory 712. The hardware elements may include one or more processors 702, including without limitation one or more general-purpose processors and/or one or more special-purpose processors (such as digital signal processing chips, graphics acceleration processors, and/or the like), memory 712, DSP 704, a wireless transceiver 706, a bus 716, and antenna 708. Furthermore, in addition to the wireless transceiver 706, server 700 can further include a network interface 714 to communicate with a network (e.g., a local area network, a network of a preferred carrier, Internet, etc.).

The server 700 may further include (and/or be in communication with) one or more non-transitory machine-readable storage mediums or storage devices (e.g., memory 712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 712. The server 700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 712 may be a non-transitory machine-readable storage medium, processor-readable memory, and/or a computer-readable memory that stores the one or more computer-program products configured to cause the processor(s) 702 to perform the various functions. In other embodiments, one or more functions may be performed in hardware.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Figure 8:
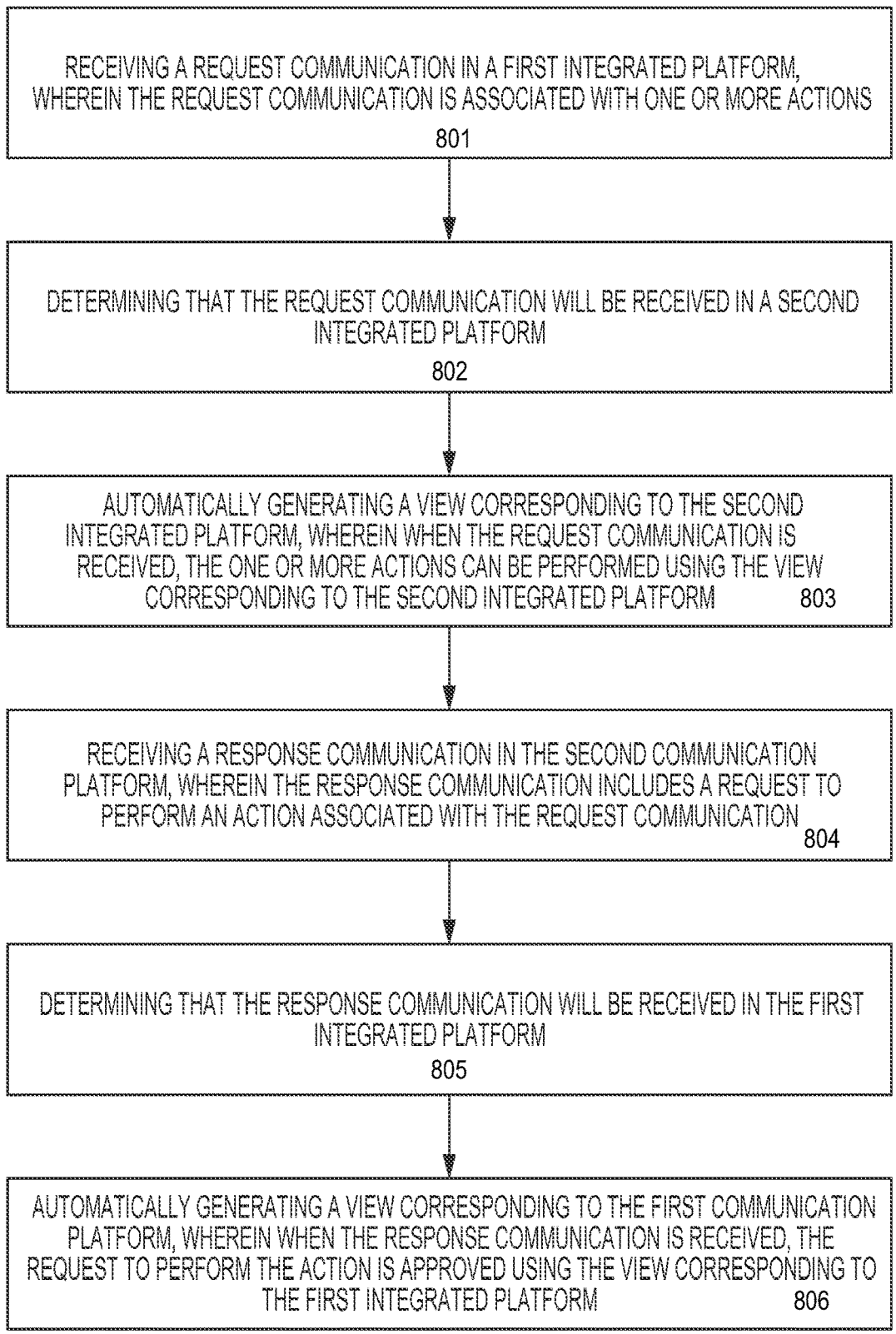
FIG. 8 illustrates an example process 800 corresponding to the present integration platform.

FIG. 8 illustrates an example process 800 corresponding to the present integration platform. In some implementations, the integration platform receives 801 a request communication in a first integrated platform (e.g., an email). An integrated platform, as used herein, refers to a platform that can be integrated using the integration platform described herein (e.g., communication platform, a business operations platform, or any other platform that can be integrated using the integration platform). The request communication can be associated with one or more actions that can be performed. In these implementations, a determination can be made that the request communication will be received 802 in a second integrated platform (e.g., SMS). In determining that the request communication will be received in a second integrated platform, the integration platform can automatically generate a view 803 (e.g., a view that corresponds to the second integrated platform). In these implementations, when the request communication is received, the one or more actions associated with the request communication can be performed using the view that corresponds to the second platform (e.g., using SMS).

In some implementations, a response communication can be received 804 by the integration platform, and the response can be in the second integrated platform (e.g., SMS). In these implementations, the response communication can include a request to perform one or more of the one or more actions associated with the request communication. Additionally, a determination can be made that the response communication will be received 805 in the first integrated platform (e.g., email). In determining that the response communication will be received in the first integrated platform, the integration platform can automatically generate a view 806 (e.g., a view that corresponds to the first integrated platform). In these implementations, when the response communication is received, the request to perform one or more of the one or more actions can be approved using the view corresponding to the first integrated platform (e.g., using SMS). In some cases, the integration platform can receive a request and/or a response originating from one or more external platforms that are external from the integration platform.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A computer-implemented method, comprising:
   receiving a request communication in a first integrated platform, wherein the request communication is associated with one or more actions, and wherein the first integrated platform includes a first application layer;
   determining whether the preferred method of communication associated with a receiver of the request communication is a second integrated platform, wherein the second integrated platform includes a second application layer;
   automatically generating an accessible view corresponding to the second integrated platform, wherein when the request communication is received, the second application layer can be used to initiate an action using the accessible view corresponding to the second integrated platform;

receiving a response communication in the second integrated platform, wherein the response communication includes a request to perform the action associated with the request communication;

determining that the response communication will be received in the first integrated platform;

determining whether the preferred method of communication associated with a receiver of the response communication is the first integrated platform; and automatically generating an accessible view corresponding to the first integrated platform, wherein when the response communication is received, the first application layer can be used to approve performance of the action using the accessible view corresponding to the first integrated platform.

2. The computer-implemented method of claim 1, wherein the one or more actions include viewing an object.

3. The computer-implemented method of claim 1, wherein a view corresponding to the first integrated platform is also automatically generated when the preferred method of communication associated with a receiver of the request communication is the second integrated platform.

4. The computer-implemented method of claim 1, wherein a view corresponding to the second integrated platform is also automatically generated when the preferred method of communication associated with a receiver of the response communication is the first integrated platform.

5. The computer-implemented method of claim 1, wherein an accessible view includes a channel view or a familiar interface.

6. The computer-implemented method of claim 1, further comprising:
determining an optimum presentation for the receiver of the request communication.

7. The computer-implemented method of claim 1, further comprising:
determining an optimum presentation for the receiver of the response communication.

8. A system, comprising:
a storage configured to store instructions; and
a processor that executes the instructions, wherein execution of the instructions causes the processor to:
receive a request communication in a first integrated platform, wherein the request communication is associated with one or more actions, and wherein the first integrated platform includes a first application layer;
determine whether the preferred method of communication associated with a receiver of the request communication is a second integrated platform, wherein the second integrated platform includes a second application layer;
automatically generate an accessible view corresponding to the second integrated platform, wherein when the request communication is received, the second application layer can be used to initiate an action using the accessible view corresponding to the second integrated platform;
receive a response communication in the second integrated platform, wherein the response communication includes a request to perform the action associated with the request communication;
determine that the response communication will be received in the first integrated platform;
determine whether the preferred method of communication associated with a receiver of the response communication is the first integrated platform; and
automatically generate an accessible view corresponding to the first integrated platform, wherein when the response communication is received, the first application layer can be used to approve performance of the action using the accessible view corresponding to the first integrated platform.

9. The system of claim 8, wherein the one or more actions include viewing an object.

10. The system of claim 8, wherein a view corresponding to the first integrated platform is also automatically generated when the preferred method of communication associated with a receiver of the request communication is the second integrated platform.

11. The system of claim 8, wherein a view corresponding to the second integrated platform is also automatically generated when the preferred method of communication associated with a receiver of the response communication is the first integrated platform.

12. The system of claim 8, wherein an accessible view includes a channel view or a familiar interface.

13. The system of claim 8, further comprising instructions, that when executed, cause the processor to:
determine an optimum presentation for the receiver of the request communication.

14. The system of claim 8, further comprising instructions, that when executed, cause the processor to:
determine an optimum presentation for the receiver of the response communication.

15. A non-transitory, computer-readable storage medium storing thereon executable instructions that, as a result of being executed by one or more processors of a computer system, cause the computer system to:
receive a request communication in a first integrated platform, wherein the request communication is associated with one or more actions, and wherein the first integrated platform includes a first application layer;
determine whether the preferred method of communication associated with a receiver of the request communication is a second integrated platform, wherein the second integrated platform includes a second application layer;
automatically generate an accessible view corresponding to the second integrated platform, wherein when the request communication is received, the second application layer can be used to initiate an action using the accessible view corresponding to the second integrated platform;
receive a response communication in the second integrated platform, wherein the response communication includes a request to perform the action associated with the request communication;
determine that the response communication will be received in the first integrated platform;
determine whether the preferred method of communication associated with a receiver of the response communication is the first integrated platform; and
automatically generate an accessible view corresponding to the first integrated platform, wherein when the response communication is received, the first application layer can be used to approve performance of the action using the accessible view corresponding to the first integrated platform.

16. The non-transitory, computer-readable storage medium of claim 15, wherein the one or more actions include viewing an object.

17. The non-transitory, computer-readable storage medium of claim 15, wherein a view corresponding to the first integrated platform is also automatically generated when the preferred method of communication associated with a receiver of the request communication is the second integrated platform.

18. The non-transitory, computer-readable storage medium of claim 15, wherein a view corresponding to the second integrated platform is also automatically generated when the preferred method of communication associated with a receiver of the response communication is the first integrated platform.

19. The non-transitory, computer-readable storage medium of claim 15, wherein an accessible view includes a channel view or a familiar interface.

20. The non-transitory, computer-readable storage medium of claim 15, further comprising instructions, that when executed, cause the computer system to:
   determine an optimum presentation for the receiver of the request communication.

21. The non-transitory, computer-readable storage medium of claim 15, further comprising instructions, that when executed, cause the computer system to:
   determine an optimum presentation for the receiver of the response communication.

\* \* \* \* \*